(12) United States Patent
Jeong et al.

(10) Patent No.: US 12,151,448 B2
(45) Date of Patent: Nov. 26, 2024

(54) HOT-PRESS SYSTEM FOR FOLDING SURFACE OF POUCH-TYPE SECONDARY BATTERY

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 145 days.

(21) Appl. No.: 17/915,193

(22) PCT Filed: Mar. 10, 2022

(86) PCT No.: PCT/KR2022/003339
§ 371 (c)(1),
(2) Date: Sep. 28, 2022

(87) PCT Pub. No.: WO2022/191624
PCT Pub. Date: Sep. 15, 2022

(65) Prior Publication Data
US 2023/0136385 A1 May 4, 2023

(30) Foreign Application Priority Data
Mar. 9, 2021 (KR) .......................... 10-2021-0031044

(51) Int. Cl.
*B30B 9/28* (2006.01)
*B30B 7/04* (2006.01)
(Continued)

(52) U.S. Cl.
CPC .................. *B30B 9/28* (2013.01); *B30B 7/04* (2013.01); *B30B 15/041* (2013.01); *B30B 15/08* (2013.01);
(Continued)

(58) Field of Classification Search
CPC ........... B30B 7/04; B30B 9/28; B30B 15/041; B30B 15/08; B30B 15/34; B29C 65/00;
(Continued)

(56) References Cited

FOREIGN PATENT DOCUMENTS

JP      2001-160379 A    6/2001
KR      10-1423700 B1    8/2014
(Continued)

OTHER PUBLICATIONS

International Search Report from corresponding PCT Application No. PCT/KR2022/003339, dated Jul. 7, 2022.

*Primary Examiner* — Jimmy T Nguyen
(74) *Attorney, Agent, or Firm* — Harness, Dickey & Pierce, P.L.C.

(57) ABSTRACT

A hot-press system for folding a surface of a pouch-type secondary battery, the hot-press system including: a first folded surface pressing unit configured to hold a main chamber and long-side terraces, which have folded surfaces, of a secondary battery, the first folded surface pressing unit being configured to primarily press the folded surfaces while applying heat and pressure to the folded surfaces, and a second folded surface pressing unit configured to hold the main chamber and the long-side terraces, which have the folded surfaces, of the secondary battery guided from the first folded surface pressing unit, the second folded surface pressing unit being configured to secondarily press the folded surfaces while applying heat and pressure to the folded surfaces.

22 Claims, 15 Drawing Sheets

(51) Int. Cl.
  *B30B 15/04* (2006.01)
  *B30B 15/08* (2006.01)
  *B30B 15/34* (2006.01)
  *H01M 50/10* (2021.01)
  *H01M 50/105* (2021.01)
  *H01M 50/136* (2021.01)
  *H01M 50/145* (2021.01)

(52) U.S. Cl.
  CPC ........... *B30B 15/34* (2013.01); *H01M 50/105* (2021.01); *H01M 50/136* (2021.01); *H01M 50/145* (2021.01)

(58) Field of Classification Search
  CPC ...... B29C 65/18; B29C 65/78; H01M 50/105; H01M 50/136; H01M 50/145; H01M 10/045; H01M 10/0468; H01M 10/0472; H01M 50/19; H01M 50/186; Y02E 60/10; B29L 2031/00
  See application file for complete search history.

(56) References Cited

FOREIGN PATENT DOCUMENTS

| | | | |
|---|---|---|---|
| KR | 10-1958882 B1 | 3/2019 | |
| KR | 102104319 B1 * | 4/2020 | .......... H01M 2/0275 |
| KR | 10-2132593 B1 | 7/2020 | |
| KR | 10-2148997 B1 | 8/2020 | |

* cited by examiner

PRIOR ART

HOT-PRESS SYSTEM FOR FOLDING SURFACE OF POUCH-TYPE SECONDARY BATTERY

CROSS-REFERENCE TO RELATED APPLICATIONS

This application is a national phase application of PCT Application No. PCT/KR2022/003339, filed on 10 Mar. 2022, which claims the benefit and priority to Korean Patent Application No. 10-2021-0031044, filed on 9 Mar. 2021. The entire disclosures of the applications identified in this paragraph are incorporated herein by references.

TECHNICAL FIELD

The present disclosure relates to a hot-press system for folding a surface of a pouch-type secondary battery.

BACKGROUND ART

In general, as illustrated in FIG. 1, a pouch-type secondary battery 1 (hereinafter, referred to as a "secondary battery") includes an electrode assembly 2, a pouch casing 3 configured to accommodate the electrode assembly 2 and an electrolyte, and electrode tabs 4 extending and protruding to the outside from the electrode assembly 2.

Further, the pouch casing 3 includes an upper pouch 5 and a lower pouch 6. The upper and lower pouches 5 and 6 define a main chamber M that accommodates the electrode assembly 2 and the electrolyte therein. Edges (hereinafter, referred to as "terraces") 7 of the upper and lower pouches 5 and 6 are bonded (sealed) to each other.

In this case, typically, the upper and lower pouches 5 and 6 may each be provided in the form of a thin aluminum film to protect the electrolyte and the electrode assembly 2, cope with the electrochemical characteristics of the electrode assembly 2, and ensure heat dissipation performance. To bond the upper and lower pouches 5 and 6, polymers, such as casted polypropylene (CPP) resin or polypropylene (PP) resin, are applied onto the thin aluminum films constituting the upper and lower pouches 5 and 6, and the applied polymers are fused to define bonding layers.

Meanwhile, the terrace 7 formed by bonding the upper and lower pouches 5 and 6 includes long-side terraces 7a supported on two opposite surfaces of the main chamber M, and short-side terraces 7b supported on two opposite ends of the main chamber M. The long-side terrace 7a is folded in multiple stages (see FIG. 4) to prevent corrosion occurring in a bonded portion, improve rigidity of the pouch casing 3, reduce an overall size, and minimize a space occupied by the secondary battery 1. Therefore, the long-side terrace 7a has a folded surface 8 folded in multiple stages.

However, cracks, cavities, and portions point-fused as illustrated in FIG. 2 (hereinafter, referred to as "point-fused portions") are present in a bonding layer of the terrace 7 due to several causes such as defects occurring during a manufacturing process.

In particular, as illustrated in FIGS. 3 and 4, the point-fused portions are pulled by the expansion of an outer sheath, which defines the folded surface 8, during a folding process. For this reason, there is a problem in that the bonding layer of the terrace 7 connected to the point-fused portions separates from the thin aluminum film.

The above-mentioned problem causes a problem in that the electrical insulation of the secondary battery 1 is broken down because the electrolyte accommodated in the main chamber M comes into contact with the thin aluminum film. Further, there is another problem in that the insulation breakdown of the secondary battery 1 causes a large-scale accident such as ignition or explosion.

DISCLOSURE

Technical Problem

An object of the present disclosure is to provide a hot-press apparatus for folding a surface of a pouch-type secondary battery, which is capable of ensuring electrical insulation of a bonding layer of a folded surface.

Another object of the present disclosure is to provide a hot-press apparatus for folding a surface of a pouch-type secondary battery, which is capable of coping with spring-back of a folded surface.

Technical Solution

One aspect of the present disclosure provides a hot-press system for folding a surface of a pouch-type secondary battery, the hot-press system including: a first folded surface pressing means configured to hold a main chamber and long-side terraces, which have folded surfaces, of a secondary battery, the first folded surface pressing means being configured to primarily press the folded surfaces while applying heat and pressure to the folded surfaces; and a second folded surface pressing means configured to hold the main chamber and the long-side terraces, which have the folded surfaces, of the secondary battery guided from the first folded surface pressing means, the second folded surface pressing means being configured to secondarily press the folded surfaces while applying heat and pressure to the folded surfaces.

The hot-press system for folding a surface of a pouch-type secondary battery according to one aspect of the present disclosure may further include a main chamber alignment means configured to align the main chamber of the secondary battery having the folded surfaces and guide the secondary battery to the first folded surface pressing means, in which the main chamber alignment means includes: a pair of alignment bodies installed to face each other with the main chamber of the secondary battery, which is guided from a preceding process, interposed therebetween, the pair of alignment bodies being configured to align the main chamber while moving to the main chamber.

In the hot-press system for folding a surface of a pouch-type secondary battery according to one aspect of the present disclosure, the alignment bodies may include: first contact portions configured to come into contact with a lower surface of the main chamber; and second contact portions configured to come into contact with a lateral surface of the main chamber.

In the hot-press system for folding a surface of a pouch-type secondary battery according to one aspect of the present disclosure, the second contact portion may be configured to come into contact with the lateral surface of the main chamber having the long-side terrace connected to the lower surface of the main chamber.

In the hot-press system for folding a surface of a pouch-type secondary battery according to one aspect of the present disclosure, the first contact portion and the second contact portion may intersect each other at a right angle.

In the hot-press system for folding a surface of a pouch-type secondary battery according to one aspect of the present disclosure, protrusions each protruding in a hemispherical shape may be formed on the first contact portion and disposed in a plurality of columns and rows to minimize friction with the lower surface of the main chamber during a process of aligning the main chamber.

The hot-press system for folding a surface of a pouch-type secondary battery according to one aspect of the present disclosure may further include a first air spray unit configured to spray air toward an upper surface of the main chamber to prevent the main chamber from being lifted up from the alignment bodies when the alignment bodies align the main chamber.

In the hot-press system for folding a surface of a pouch-type secondary battery according to one aspect of the present disclosure, the first air spray unit may include: a first compressor configured to generate compressed air; and first spray nozzles configured to spray compressed air, which is supplied from the first compressor, toward the upper surface of the main chamber.

In the hot-press system for folding a surface of a pouch-type secondary battery according to one aspect of the present disclosure, the first spray nozzles may be connected to the first compressor through a flow path, and the first spray nozzles may be installed in branch flow paths that branch off from a flow path and face the upper surface of the main chamber, or the first spray nozzles may be installed on a lower surface of a plate that has therein a flow path chamber connected to the flow path and faces the upper surface of the main chamber.

In the hot-press system for folding a surface of a pouch-type secondary battery according to one aspect of the present disclosure, the main chamber alignment means may further include second air spray units configured to spray air toward a lower surface of the main chamber to move the main chamber when the alignment bodies align the main chamber.

In the hot-press system for folding a surface of a pouch-type secondary battery according to one aspect of the present disclosure, the second air spray unit may include: a second compressor configured to generate compressed air; and second spray nozzles configured to spray the compressed air, which is supplied from the second compressor, toward the lower surface of the main chamber.

In the hot-press system for folding a surface of a pouch-type secondary battery according to one aspect of the present disclosure, the second spray nozzles may be connected to the second compressor through a flow path, and the second spray nozzles may be installed on first contact portions of the alignment bodies that come into contact with the lower surface of the main chamber.

In the hot-press system for folding a surface of a pouch-type secondary battery according to one aspect of the present disclosure, the first folded surface pressing means may include: a first grip unit configured to hold the main chamber and the long-side terraces, which have the folded surfaces, of the secondary battery guided from the main chamber alignment means; a first pressing unit configured to primarily press the folded surfaces while applying heat and pressure to the folded surfaces; and a first cell transfer shuttle configured to load the secondary battery at the main chamber alignment means and unload the secondary battery onto the first grip unit.

In the hot-press system for folding a surface of a pouch-type secondary battery according to one aspect of the present disclosure, the first grip unit may include: first station tables configured to suck the main chamber; first lower props configured to come into contact with lower surfaces of the long-side terraces; and first upper props configured to hold the long-side terraces together with the first lower props while coming into contact with upper surfaces of the long-side terraces exposed between the folded surfaces and a lateral surface of the main chamber.

In the hot-press system for folding a surface of a pouch-type secondary battery according to one aspect of the present disclosure, the first station tables may be provided as a pair of first station tables and installed to face the lower surface of the main chamber guided from the main chamber alignment means, and the first station tables may extend in the longitudinal direction of the main chamber.

In the hot-press system for folding a surface of a pouch-type secondary battery according to one aspect of the present disclosure, the first lower props may be provided as a pair of first lower props, the first lower props may be installed to face the lower surfaces of the long-side terraces of the secondary battery vacuum-sucked by the first station tables, and the first lower props may extend in a longitudinal direction of the long-side terraces and be installed to be movable upward or downward toward the lower surfaces of the long-side terraces.

In the hot-press system for folding a surface of a pouch-type secondary battery according to one aspect of the present disclosure, first lower cutting-edge portions may be formed on the first lower props and configured to come into contact with the lower surfaces of the long-side terraces and extend vertically, and edges of extension ends of the first lower cutting-edge portions may be rounded.

In the hot-press system for folding a surface of a pouch-type secondary battery according to one aspect of the present disclosure, first lower protruding support portions may be formed on the first lower cutting-edge portions and configured to come into contact with lower surfaces of short-side terraces connected to the long-side terraces, and the first lower protruding support portions may hold the short-side terraces together with the first upper protruding support portions formed on the first upper props.

In the hot-press system for folding a surface of a pouch-type secondary battery according to one aspect of the present disclosure, the first upper props may be provided as a pair of first upper props, the first upper props may be installed to face the upper surfaces of the long-side terraces of the secondary battery vacuum-sucked by the first station tables, and the first upper props may extend in the longitudinal direction of the long-side terraces and be installed to be movable upward or downward toward the upper surfaces of the long-side terraces.

In the hot-press system for folding a surface of a pouch-type secondary battery according to one aspect of the present disclosure, first upper cutting-edge portions may be formed on the first upper props and configured to come into contact with the upper surfaces of the long-side terraces and extend vertically, and edges of extension ends of the first upper cutting-edge portions may be rounded.

In the hot-press system for folding a surface of a pouch-type secondary battery according to one aspect of the present disclosure, first upper protruding support portions may be formed on the first upper cutting-edge portions and configured to come into contact with upper surfaces of short-side terraces connected to the long-side terraces, and the first upper protruding support portions may hold the short-side terraces together with the first lower protruding support portions formed on the first lower props.

In the hot-press system for folding a surface of a pouch-type secondary battery according to one aspect of the present disclosure, first contact protrusion portions may be formed on outer surfaces of the first upper cutting-edge portions facing the folded surfaces and configured to come into contact with non-bonded areas of the long-side terraces folded along the folded surfaces, and the first contact protrusion portions may extend in a longitudinal direction of the first upper cutting-edge portions.

In the hot-press system for folding a surface of a pouch-type secondary battery according to one aspect of the present disclosure, the first pressing unit may include a pair of first pressing heads installed to face lateral surfaces of the folded surfaces of the secondary battery held by the first grip unit, and the first pressing heads horizontally may extend in a longitudinal direction of the folded surfaces and be installed to be movable to press the folded surfaces.

In the hot-press system for folding a surface of a pouch-type secondary battery according to one aspect of the present disclosure, tip portions of the first pressing heads may each be formed to have a thickness that faces a bonding layer of the folded surface and a non-bonded area of the long-side terrace folded along the folded surface, and the tip portions of the first pressing heads may be vertically formed to press the folded surfaces toward the vertical first upper cutting-edge portions of the first upper props.

In the hot-press system for folding a surface of a pouch-type secondary battery according to one aspect of the present disclosure, first heaters may be embedded in the first pressing heads and melt bonding layers of the folded surfaces when the folded surfaces are pressed.

In the hot-press system for folding a surface of a pouch-type secondary battery according to one aspect of the present disclosure, first heat pads may be attached to the tip portions of the first pressing heads and uniformly transfer heat of the first heaters to the folded surfaces while serving as a buffer at the time of pressing the folded surfaces.

In the hot-press system for folding a surface of a pouch-type secondary battery according to one aspect of the present disclosure, the second folded surface pressing means may include: a second grip unit configured to hold the main chamber and the long-side terraces, which have the folded surfaces, of the secondary battery guided from the first folded surface pressing means; a second pressing unit configured to secondarily press the folded surfaces while applying heat and pressure to the folded surfaces; and a second cell transfer shuttle configured to load the secondary battery at the first folded surface pressing means and unload the secondary battery onto the second grip unit.

In the hot-press system for folding a surface of a pouch-type secondary battery according to one aspect of the present disclosure, the second grip unit may include: second station tables configured to suck the main chamber; second lower props configured to come into contact with lower surfaces of the long-side terraces; and second upper props configured to hold the long-side terraces together with the second lower props while coming into contact with upper surfaces of the long-side terraces exposed between the folded surfaces and a lateral surface of the main chamber.

In the hot-press system for folding a surface of a pouch-type secondary battery according to one aspect of the present disclosure, the second station tables may be provided as a pair of second station tables and installed to face the lower surface of the main chamber guided from the first folded surface pressing means, and the second station tables may extend in the longitudinal direction of the main chamber.

In the hot-press system for folding a surface of a pouch-type secondary battery according to one aspect of the present disclosure, the second lower props may be provided as a pair of second lower props, the second lower props may be installed to face the lower surfaces of the long-side terraces of the secondary battery vacuum-sucked by the second station tables, and the second lower props may extend in a longitudinal direction of the long-side terraces and be installed to be movable upward or downward toward lower surface of the long-side terraces.

In the hot-press system for folding a surface of a pouch-type secondary battery according to one aspect of the present disclosure, second lower cutting-edge portions may be formed on the second lower props and configured to come into contact with the lower surfaces of the long-side terraces and extend vertically, and edges of extension ends of the second lower cutting-edge portions may be rounded.

In the hot-press system for folding a surface of a pouch-type secondary battery according to one aspect of the present disclosure, second lower protruding support portions may be formed on the second lower cutting-edge portions and configured to come into contact with lower surfaces of short-side terraces connected to the long-side terrace, and the second lower protruding support portions may hold the short-side terraces together with the second upper protruding support portions formed on the second upper props.

In the hot-press system for folding a surface of a pouch-type secondary battery according to one aspect of the present disclosure, the second upper props may be provided as a pair of second upper props, the second upper props may be installed to face the upper surfaces of the long-side terraces of the secondary battery vacuum-sucked by the second station tables, and the second upper props may extend in the longitudinal direction of the long-side terraces and may be installed to be movable upward or downward toward the upper surfaces of the long-side terraces.

In the hot-press system for folding a surface of a pouch-type secondary battery according to one aspect of the present disclosure, second upper cutting-edge portions may be formed on the second upper props and configured to come into contact with the upper surfaces of the long-side terraces and extend vertically, the second upper cutting-edge portions may extend to be inclined downward from lateral surface of the main chamber to the folded surfaces adjacent thereto, and edges of extension ends of the second upper cutting-edge portions may be rounded.

In the hot-press system for folding a surface of a pouch-type secondary battery according to one aspect of the present disclosure, second upper protruding support portions may be formed on the second upper cutting-edge portions and configured to come into contact with upper surfaces of short-side terraces connected to the long-side terraces, and the second upper protruding support portions may hold the short-side terraces together with the second lower protruding support portions formed on the second lower props.

In the hot-press system for folding a surface of a pouch-type secondary battery according to one aspect of the present disclosure, second contact protrusion portions may be formed on outer surfaces of the second upper cutting-edge portions facing the folded surfaces and configured to come into contact with non-bonded areas of the long-side terraces folded along the folded surfaces, and the second contact protrusion portions may extend in a longitudinal direction of the second upper cutting-edge portions.

In the hot-press system for folding a surface of a pouch-type secondary battery according to one aspect of the present disclosure, the second pressing unit may include a pair of second pressing heads installed to face lateral surfaces of the folded surfaces of the secondary battery held by the second grip unit, and the second pressing heads horizontally may extend in a longitudinal direction of the folded surfaces and be installed to be movable to press the folded surfaces.

In the hot-press system for folding a surface of a pouch-type secondary battery according to one aspect of the present disclosure, tip portions of the second pressing heads may each be formed to have a thickness that faces a bonding layer of the folded surface and a non-bonded area of the long-side terrace folded along the folded surface, and the tip portions of the second pressing heads may be formed to be inclined with the same inclination as the second upper cutting-edge portions to press the folded surfaces toward the inclined second upper cutting-edge portions of the second upper props.

In the hot-press system for folding a surface of a pouch-type secondary battery according to one aspect of the present disclosure, second heaters may be embedded in the second pressing heads and melt bonding layers of the folded surfaces when the folded surfaces are pressed.

In the hot-press system for folding a surface of a pouch-type secondary battery according to one aspect of the present disclosure, second heat pads may be attached to the tip portions of the second pressing heads and uniformly transfer heat of the second heaters to the folded surfaces while serving as a buffer at the time of pressing the folded surfaces.

Advantageous Effects

According to the present disclosure, the bonding layer of the folded surface may be melted through the primary and secondary melting processes, and the melted bonding layer may flow to the portion where the electrical insulation is broken down. Therefore, it is possible to restore the insulating layer, of which the electrical insulation is broken down. Therefore, it is possible to ensure the electrical insulation of the bonding layer of the folded surface.

According to the present disclosure, the folded surface may be bent toward the main chamber through the primary and secondary bending processes. Therefore, it is possible to cope with springback of the folded surface.

MODES OF THE INVENTION

Hereinafter, an embodiment of a hot-press system for folding a surface of a pouch-type secondary battery according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conform to the technical spirit of the present disclosure without being limited to a dictionary meaning when recognizing the intrinsic technical spirit of the present disclosure.

Among the accompanying drawings, FIGS. 5 to 11 are views schematically illustrating a hot-press system for folding a surface of a pouch-type secondary battery according to the present disclosure.

Figure 5:
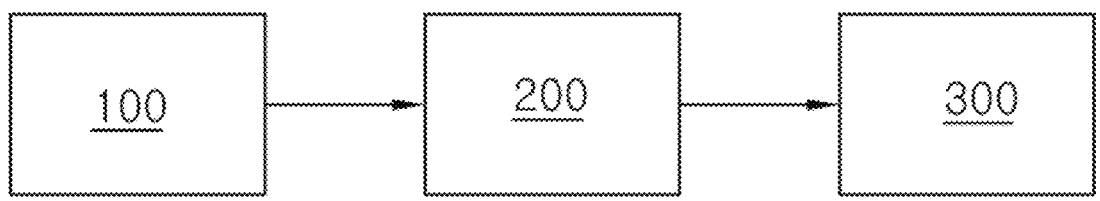
FIG. 5 is a view schematically illustrating a hot-press system for folding a surface of a pouch-type secondary battery according to the present disclosure.
Figure 6:
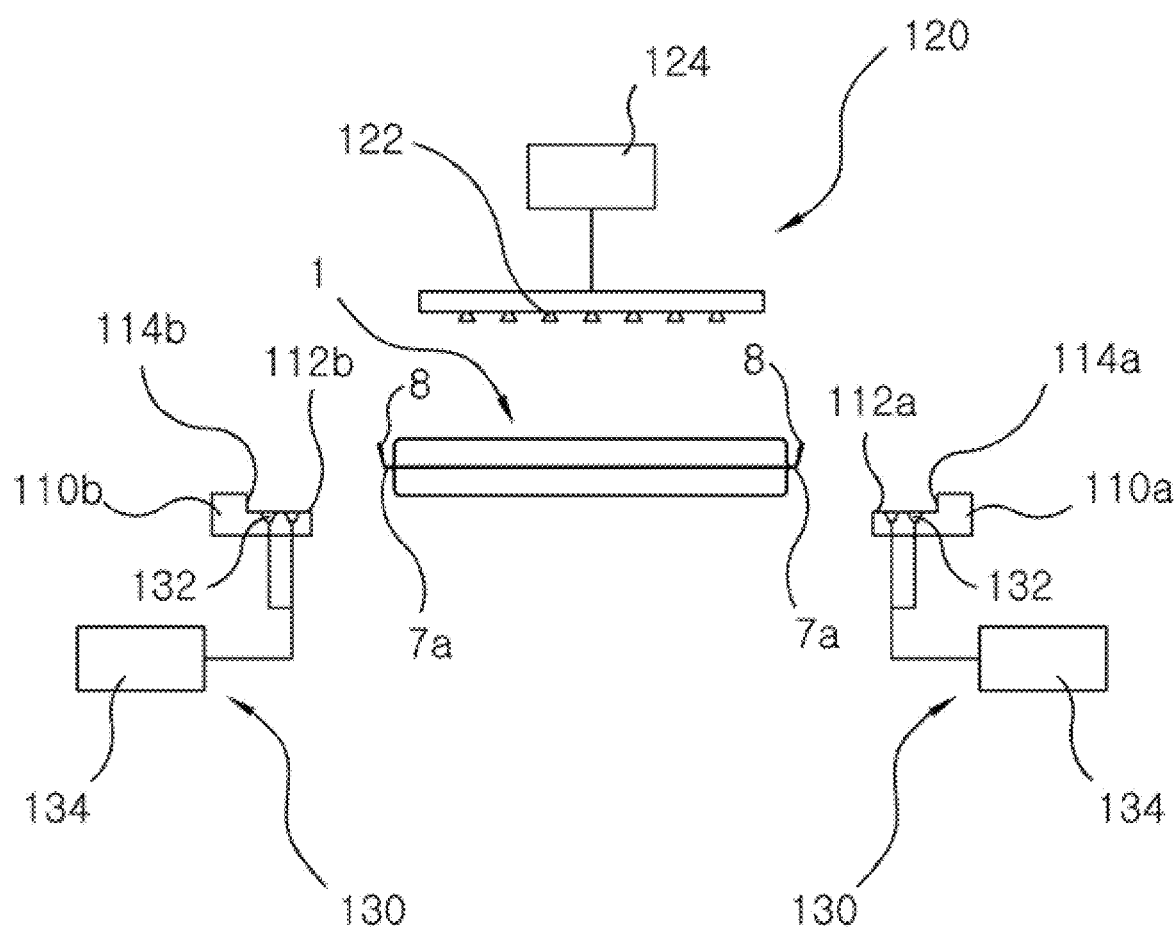
FIG. 6 is a view schematically illustrating a main chamber alignment means illustrated in FIG. 5.
Figure 7:
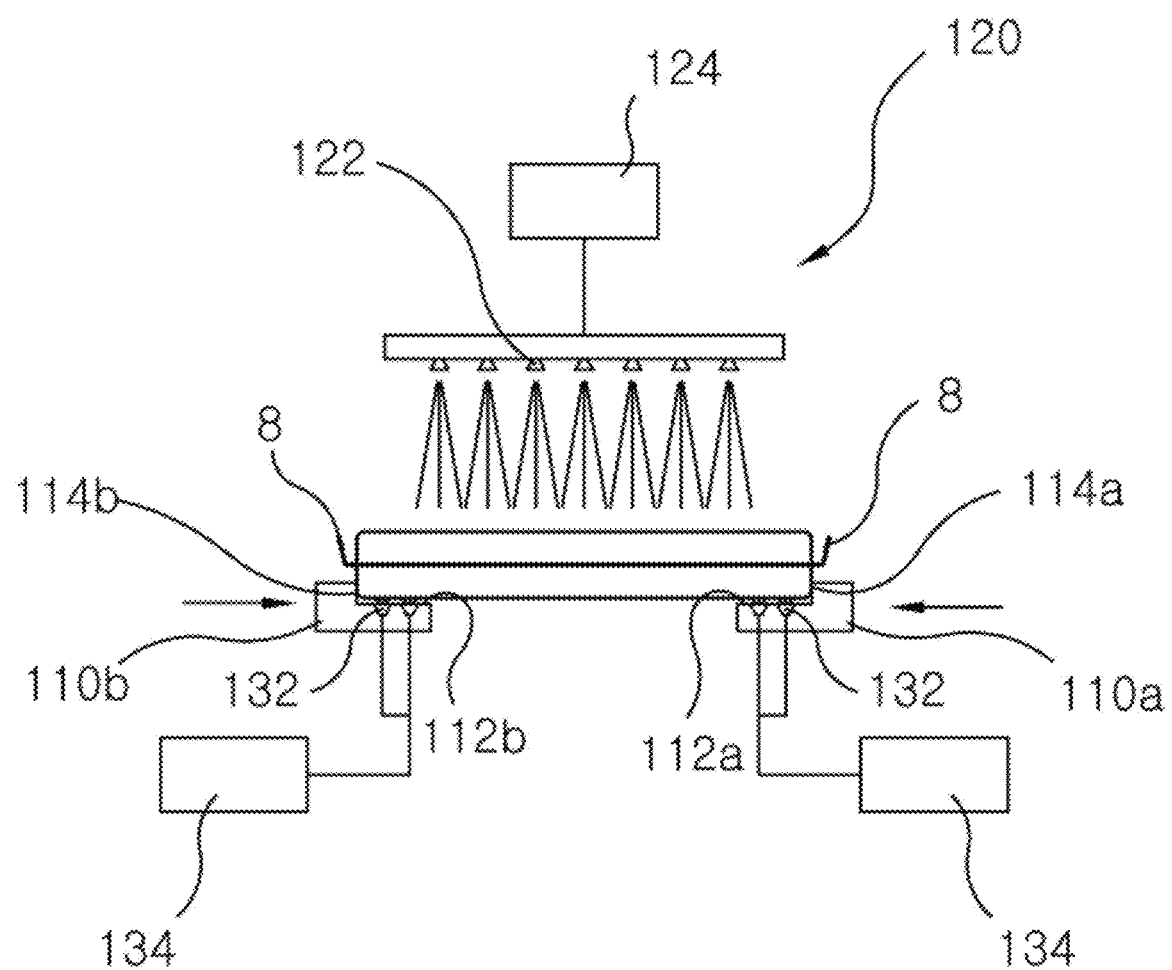
FIG. 7 is a view schematically illustrating an operating state of the main chamber alignment means illustrated in FIG. 6.
Figure 8:
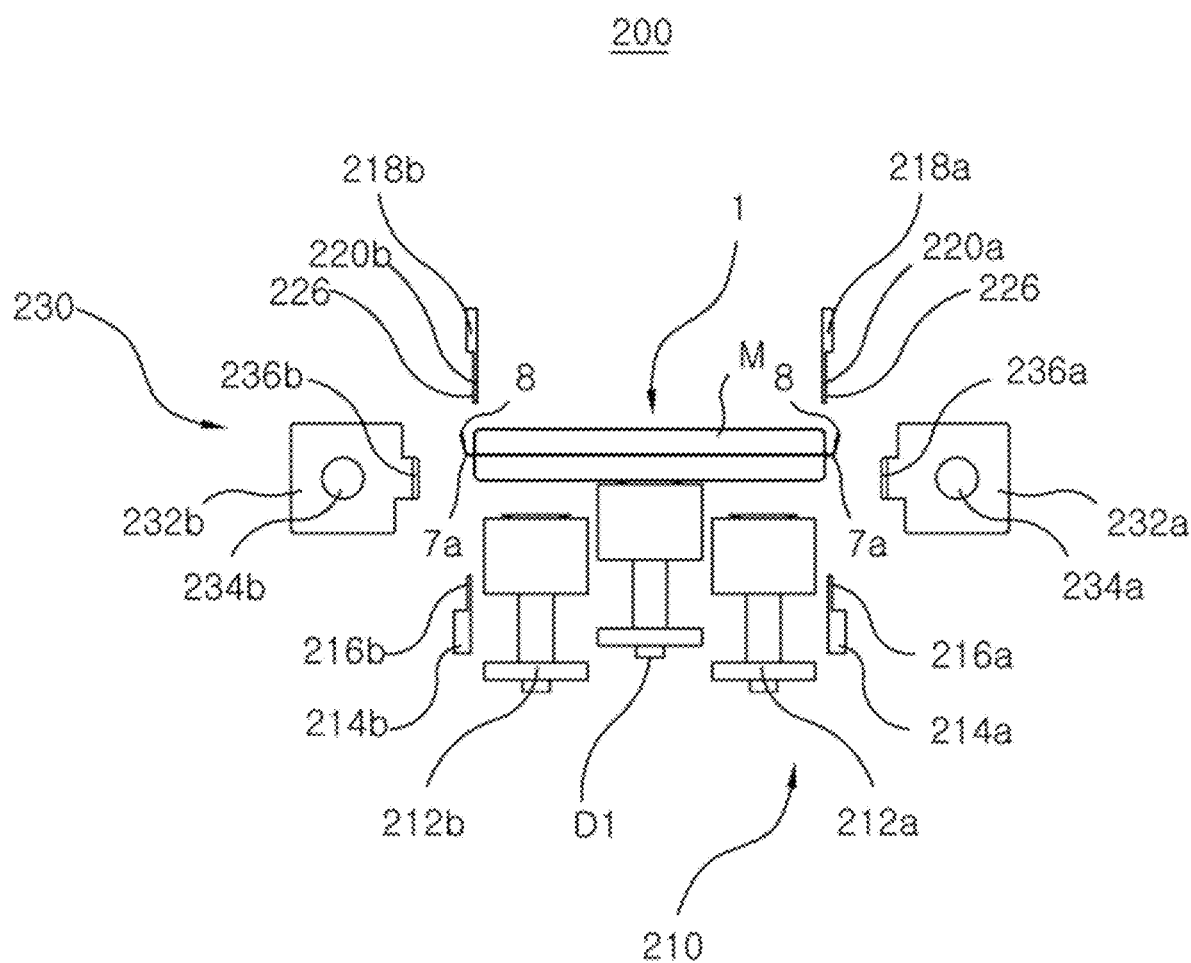
FIG. 8 is a view schematically illustrating a first folded surface pressing means illustrated in FIG. 5.
Figure 9:
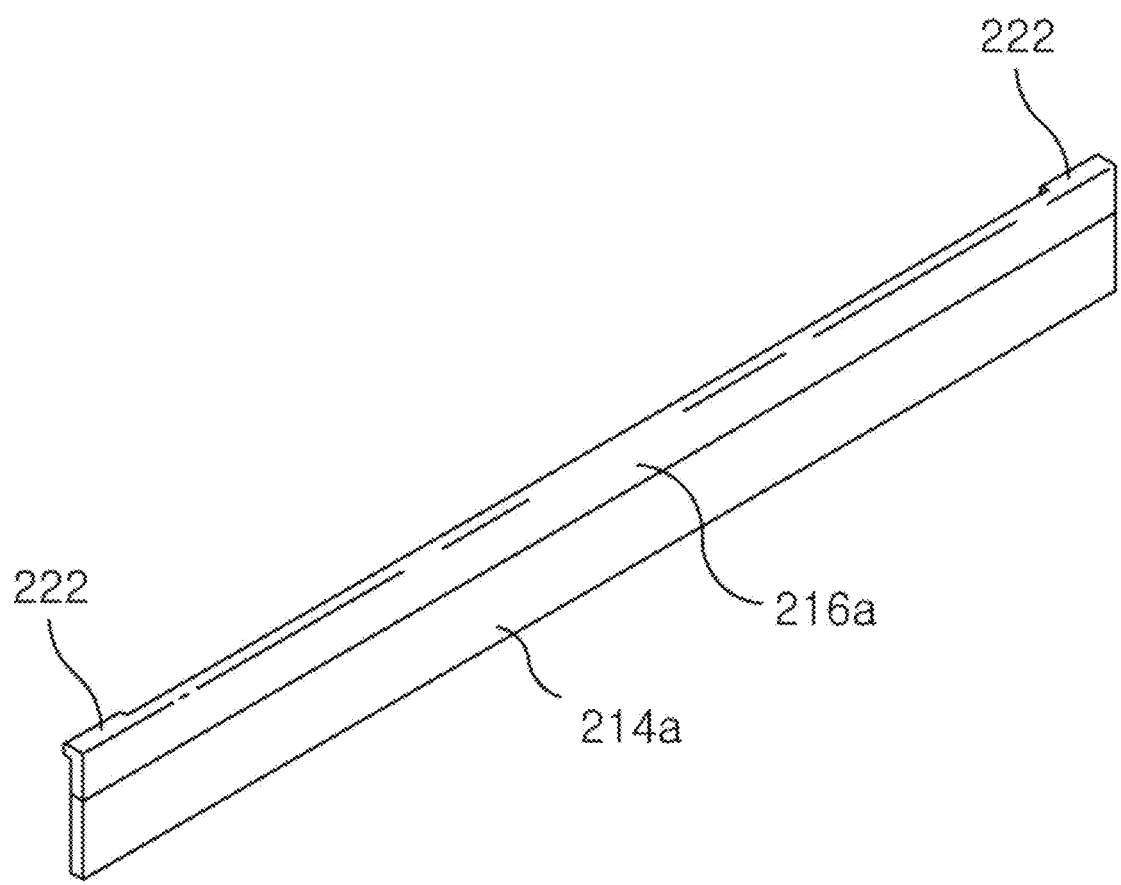
FIG. 9 is a perspective view schematically illustrating another embodiment of a first lower prop illustrated in FIG. 8.
Figure 10:
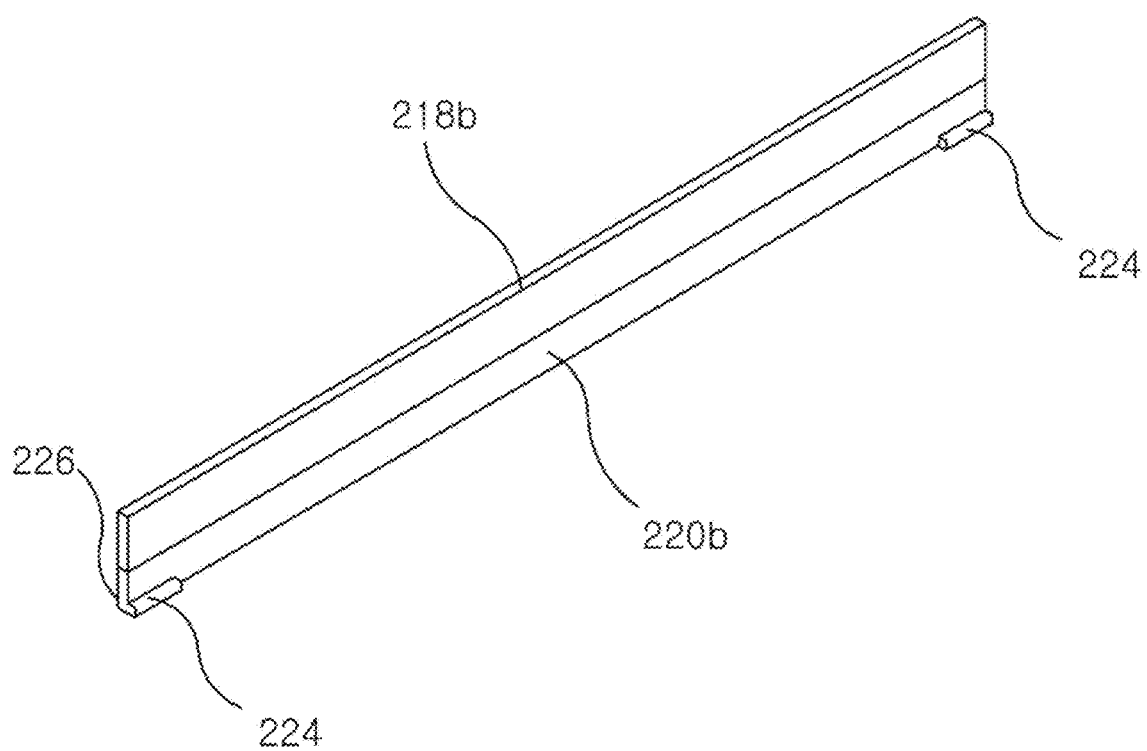
FIG. 10 is a perspective view schematically illustrating another embodiment of a first upper prop illustrated in FIG. 8.
Figure 11:
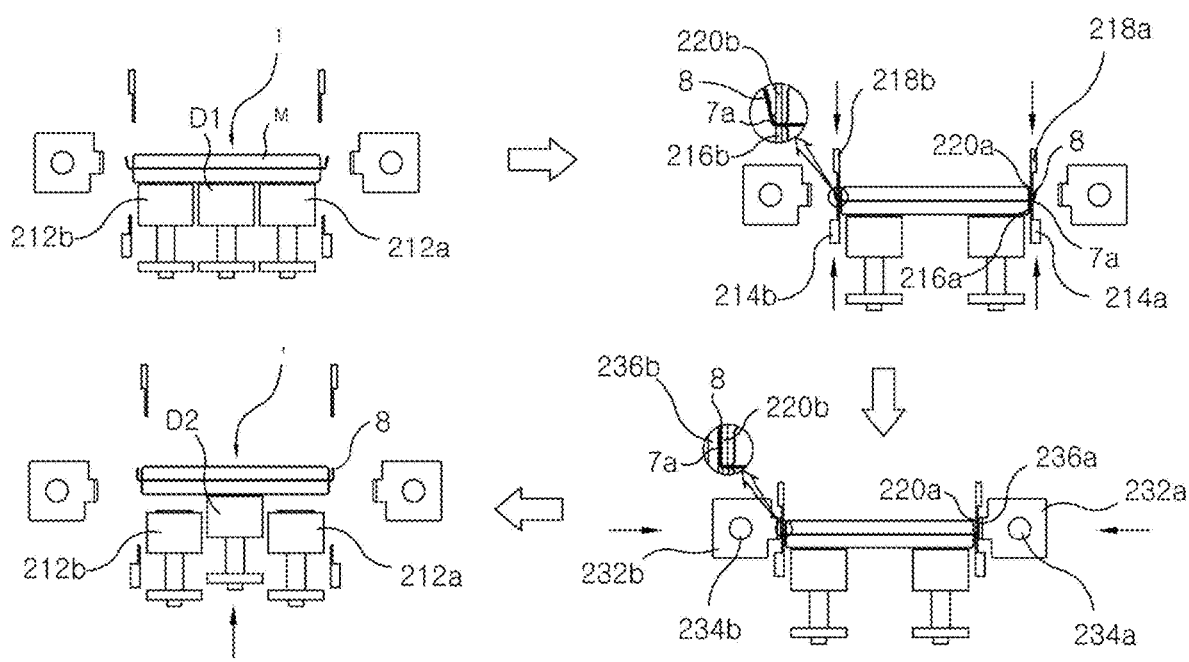
FIG. 11 is a view schematically illustrating an operating state of the first folded surface pressing means illustrated in FIG. 8.
Figure 12:
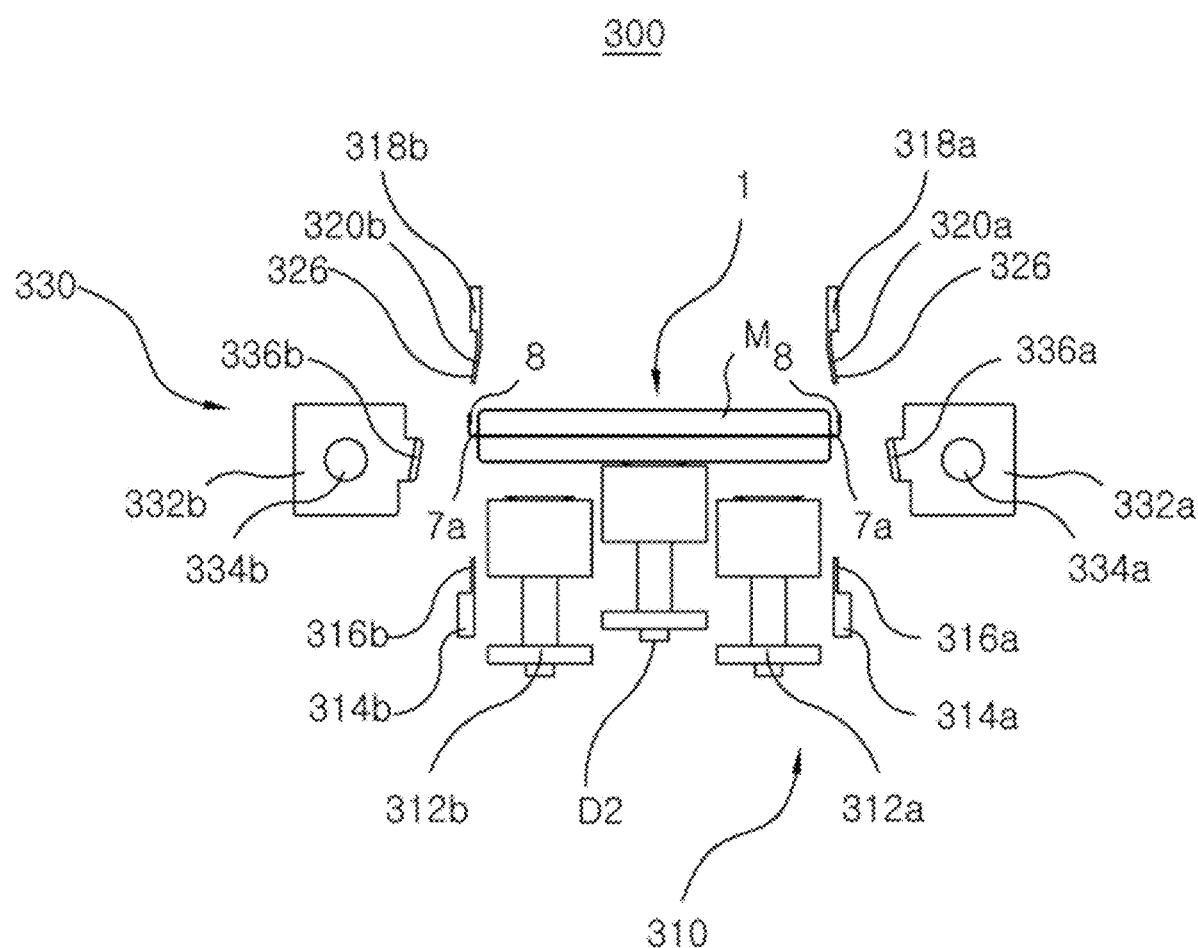
FIG. 12 is a view schematically illustrating a second folded surface pressing means illustrated in FIG. 5.
Figure 13:
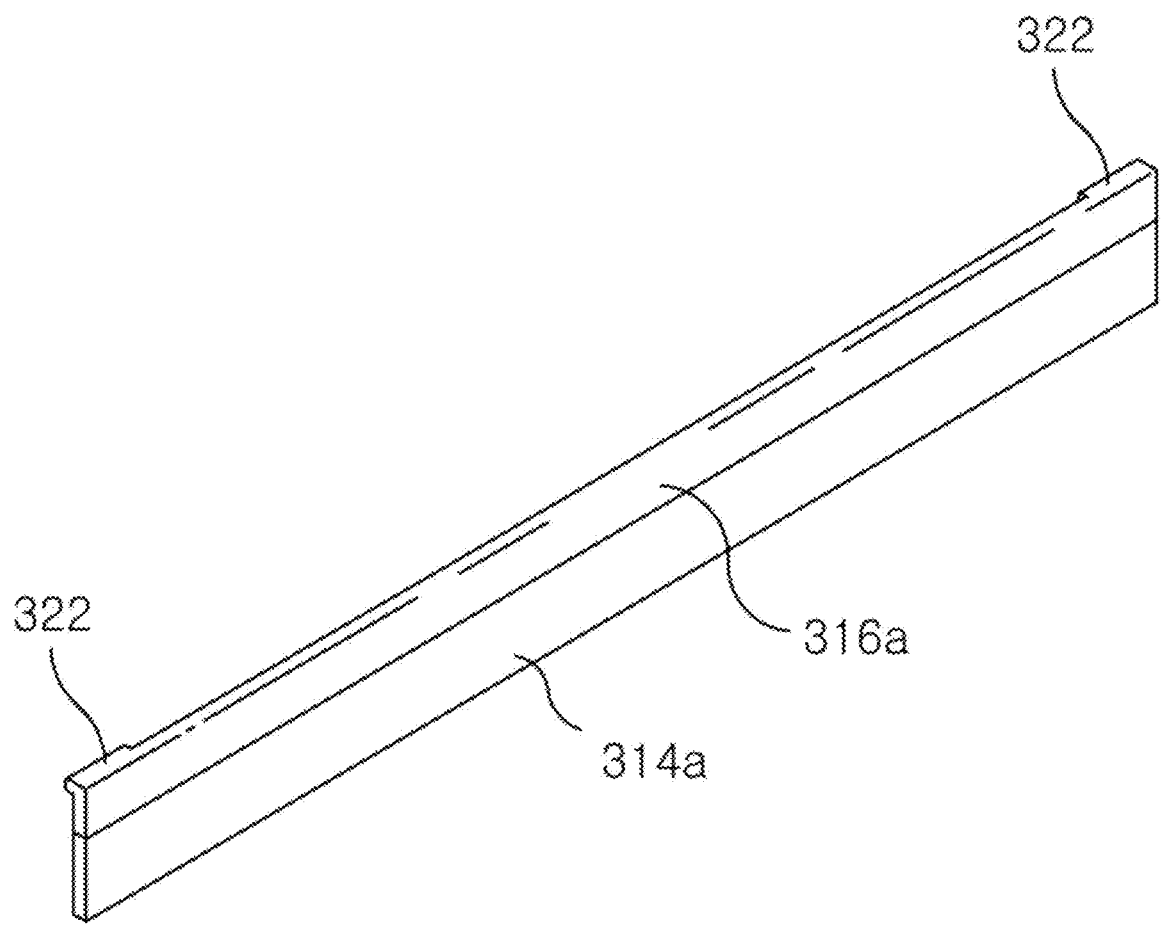
FIG. 13 is a perspective view schematically illustrating another embodiment of a second lower prop illustrated in FIG. 12.
Figure 14:
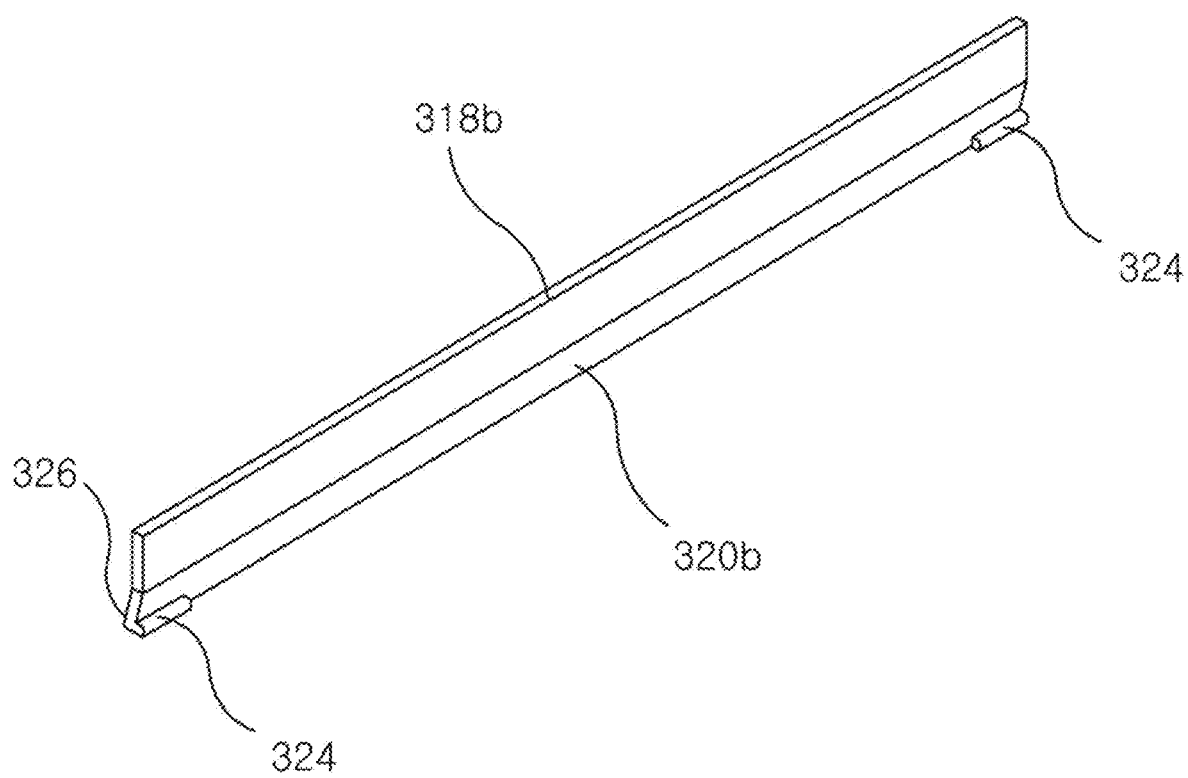
FIG. 14 is a perspective view schematically illustrating another embodiment of a second upper prop illustrated in FIG. 12.
Figure 15:
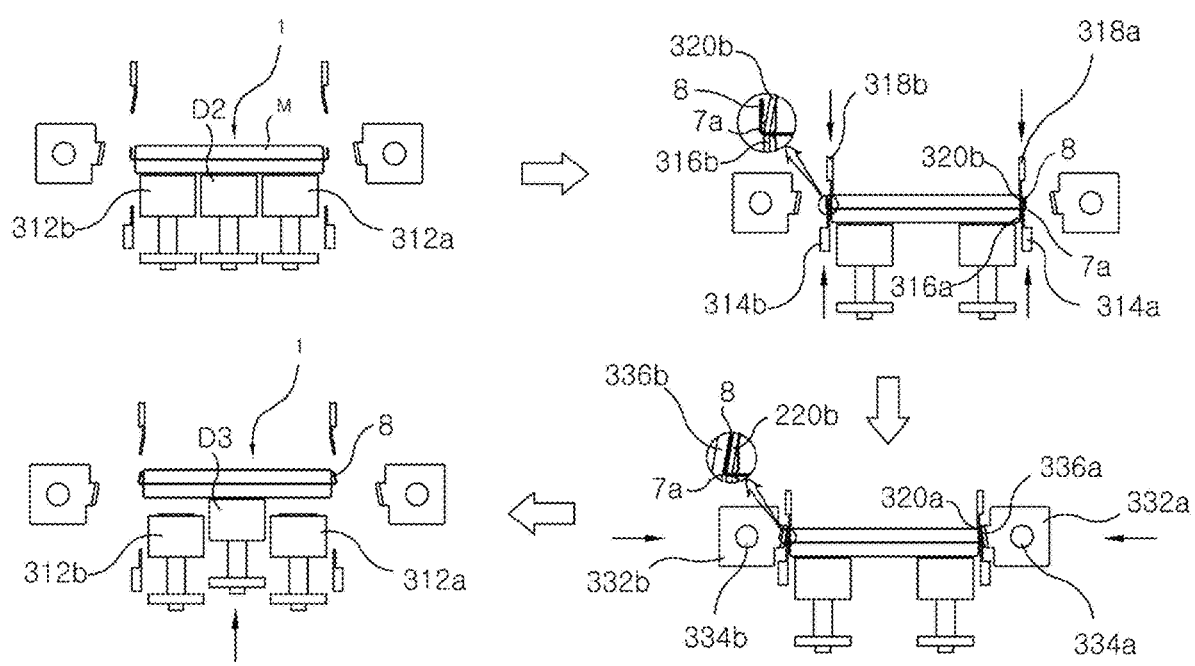
FIG. 15 is a view schematically illustrating an operating state of the second folded surface pressing means illustrated in FIG. 8.

Referring to FIG. 5, the hot-press system for folding a surface of a pouch-type secondary battery according to the present disclosure includes a main chamber alignment means 100, a first folded surface pressing means 200, and a second folded surface pressing means 300.

First, the main chamber alignment means 100 aligns a main chamber M of a secondary battery 1 having a folded surface 8 folded at 270 degrees.

In this case, the secondary battery 1 having the folded surface 8 is mounted on a cell transfer shuttle (not illustrated) and guided to the main chamber alignment means 100.

The main chamber alignment means 100 includes alignment bodies 110a and 110b, a first air spray unit 120, and second air spray units 130.

As illustrated, the alignment bodies 110a and 110b are provided as a pair of alignment bodies. The alignment bodies 110a and 110b installed to face each other with the main chamber M interposed therebetween, and the main chamber M of the secondary battery 1 is mounted on the cell transfer shuttle and guided. In this case, the alignment bodies 110a and 110b are installed to face each other in a longitudinal direction of the main chamber M of the secondary battery 1.

Meanwhile, the alignment bodies 110a and 110b are formed to come into contact with a lower surface of the main chamber M of the secondary battery 1 and a lateral surface of the main chamber M connected to the lower surface of the main chamber M without interfering with the folded surface 8 and the lower surface of the main chamber M.

To this end, the alignment bodies 110a and 110b include: first contact portions 112a and 112b configured to come into contact with a lower portion of the main chamber B; and second contact portions 114a and 114b configured to come into contact with the lateral surface of the main chamber B. The first contact portions 112a and 112b intersect the second contact portions 114a and 114b at a right angle, respectively.

Further, when the secondary battery 1 is positioned between the alignment bodies 110a and 110b respectively having the first contact portions 112a and 112b and the second contact portions 114a and 1145b, the alignment bodies 110a and 110b align the main chamber M by coming into contact with the lower surface of main chamber M and the lateral surface of the main chamber M while moving in the direction in which the alignment bodies 110a and 110b face each other. When the alignment of the main chamber M is completed, the alignment bodies 110a and 110b rectilinearly reciprocate in a direction in which the alignment bodies 110a and 110b move away from each other.

Particularly, protrusions (domes) each protruding in a hemispherical shape may be formed on the first contact portions 112a and 112b of the alignment bodies 110a and 110b and disposed in a plurality of columns and rows to minimize friction with the lower surface of the main chamber M during the process of aligning the main chamber M.

The first air spray unit 120 sprays compressed air to an upper surface of the main chamber M while the main chamber M is aligned by the alignment bodies 110a and 110b, thereby preventing the main chamber M from being raised or lifted up.

The first air spray unit 120 includes a typical first compressor 124 configured to generate compressed air, and first spray nozzles 122 configured to spray the compressed air supplied from the first compressor 124.

As illustrated, the first spray nozzles 122 are installed between the alignment bodies 110a and 110b without interfering with the secondary battery 1 guided between the alignment bodies 110a and 110b. The first spray nozzles 122 are installed to spray the compressed air toward the upper surface of the main chamber M of the secondary battery 1.

In this case, as can be seen by anyone, the first spray nozzles 122 are connected to the first compressor 124 through a flow path (tube). The first spray nozzles 122 may be installed in branch flow paths that branch off from a single flow path and face the upper surface of the main chamber M. Alternatively, the first spray nozzles 122 may be installed on a lower surface of a plate that has a flow path chamber therein and faces the upper surface of the main chamber M.

In addition, the first spray nozzles 122 may be installed to spray the compressed air toward the entire area of the upper surface of the main chamber M.

The second air spray units 130 serve to move the main chamber M by spraying compressed air toward the lower surface of the main chamber M while the main chamber M is aligned by the alignment bodies 110a and 110b.

The second air spray units 130 each include a typical second compressor 134 configured to generate compressed air, and second spray nozzles 132 configured to spray the compressed air supplied from the second compressor 134.

As illustrated, the second spray nozzles 132 are installed on the first contact portions 112a and 112b of the alignment bodies 110a and 110b and installed to spray the compressed air toward the lower surface of the main chamber M of the secondary battery 1.

In this case, as can be seen by anyone, the second spray nozzles 132 are connected to the second compressor 134 through a flow path (tube). A spray pressure of the compressed air sprayed from the second spray nozzles 132 may be equal to or lower than a spray pressure of the compressed air sprayed from the first spray nozzles 122.

That is, when the secondary battery 1, which has the folded surface 8 formed in a folding process that is a preceding process, is guided in a state in which the secondary battery 1 is mounted on a movable robot (sucked by a vacuum), the secondary battery 1 moves first in the direction in which the secondary battery 1 faces the alignment bodies 110a and 110b.

When the secondary battery 1 moves in the direction in which the secondary battery 1 faces the alignment bodies 110a and 110b as described above, the first contact portions 112a and 112b of the alignment bodies 110a and 110b come into contact with the lower surface of the main chamber M first. In this case, the movable robot unloads the secondary battery 1 onto the first contact portions 112a and 112b of the alignment bodies 110a and 110b and then moves toward the folding process. In this case, the compressed air is sprayed from the second spray nozzles 132 of the second air spray units 130, such that the main chamber M of the secondary battery 1 is floated.

Further, when the second contact portions 114a and 114b of the alignment bodies 110a and 110b, which move in the direction in which the second contact portions 114a and 114b face each other, come into contact with the lateral surface of the main chamber M, the main chamber M of the secondary battery 1 is aligned. In this case, the first spray nozzles 122 of the first air spray unit 120 spray the compressed air toward the upper surface of the main chamber M being aligned to prevent the main chamber M from being raised or lifted up.

Meanwhile, when the alignment of the main chamber M is completed, the aligned main chamber M is mounted on a first cell transfer shuttle D1 guided from the first folded surface pressing means 200. In this case, the operations of the first and second air spray units 120 and 130 are stopped, the alignment bodies 110a and 110b are returned, and the secondary battery 1 with the aligned main chamber M is guided to the first folded surface pressing means 200 along the first cell transfer shuttle D1.

The first folded surface pressing means 200 holds the main chamber M and the long-side terraces 7a of the secondary battery 1 guided to the main chamber alignment means 100 and primarily presses the spring-backed folded surfaces 8 while applying heat and pressure to the folded surfaces 8. The first folded surface pressing means 200 vertically bends the folded surface 8 and melts the bonding layer of the folded surface 8 so that the melted bonding layer flows to a portion where insulation is broken down.

The first folded surface pressing means 200 includes the first cell transfer shuttle D1, a first grip unit 210, and a first pressing unit 230.

The first cell transfer shuttle D1 is installed to reciprocate between the first folded surface pressing means 200 and the main chamber alignment means 100.

The first cell transfer shuttle D1, which is installed as described above, moves to the main chamber alignment means 100 while moving upward or downward, vacuum-sucks the lower surface of the main chamber M of the secondary battery 1, moves to the first grip unit 210, and unloads the held secondary battery 1 onto the first grip unit 210.

The first grip unit 210 holds the main chamber M and the long-side terraces 7a, which have the folded surfaces 8, of the secondary battery 1 guided from the main chamber alignment means 100.

The first grip unit 210 includes first station tables 212a and 212b, first lower props 214a and 214b, and first upper props 218a and 218b.

The first station tables 212a and 212b vacuum-suck the main chamber M of the secondary battery 1 guided from the main chamber alignment means 100.

As illustrated, the first station tables 212a and 212b are provided as a pair of first station tables. Further, the first station tables 212a and 212b are installed to face the lower surface of the main chamber M of the secondary battery 1 that is vacuum-sucked by the first cell transfer shuttle D1 and guided from the main chamber alignment means 100.

In addition, the first station tables 212a and 212b extend in the longitudinal direction of the main chamber M to safely vacuum-suck the main chamber M without swaying the main chamber M.

That is, when the secondary battery 1, which has the main chamber M aligned in the main chamber alignment means 100, is mounted on the first cell transfer shuttle D1, guided to upper portions of the first station tables 212a and 212b, and then seated on the first station tables 212a and 212b, the first station tables 212a and 212b vacuum-suck the main chamber M of the secondary battery 1. When the first station tables 212a and 212b vacuum-suck the main chamber M of the secondary battery 1, the first cell transfer shuttle D1 releases the vacuum-suction of the main chamber M of the secondary battery 1.

The first lower props 214a and 214b and the first upper props 218a and 218b come into contact with lower and upper surfaces of the long-side terraces 7a having the folded surfaces 8 and hold the long-side terraces 7a having the folded surfaces 8.

As illustrated, the first lower props 214a and 214b are provided as a pair of first lower props, and the first lower props 214a and 214b are installed to face the lower surfaces of the long-side terraces 7a vacuum-sucked by the first station tables 212a and 212b.

In this case, the first lower props 214a and 214b are each provided in the form of an approximately vertical plate extending in the longitudinal direction of the long-side terraces 7a. The first lower props 214a and 214b are installed to be movable upward or downward toward the lower surfaces of the long-side terraces 7a.

Meanwhile, the first lower props 214a and 214b have first lower cutting-edge portions 216a and 216b configured to come into contact with the lower surfaces of the long-side terraces 7a having the folded surfaces 8, and the first lower cutting-edge portions 216a and 216b extend vertically. Edge portions of extension ends of the first lower cutting-edge portions 216a and 216b are rounded to prevent the occurrence of scratches when the first lower cutting-edge portions 216a and 216b come into contact with the long-side terraces 7a.

As illustrated, like the first lower props 214a and 214b, the first upper props 218a and 218b are provided as a pair of first upper props, and the first upper props 218a and 218b are installed to face the upper surfaces of the long-side terraces 7a vacuum-sucked by the first station tables 212a and 212b.

That is, the first upper props 218a and 218b are installed to face the upper surfaces of the long-side terraces 7a exposed between the folded surfaces 8 and the lateral surfaces of the main chamber M of the secondary battery 1.

In this case, the first upper props 218a and 218b are each provided in the form of an approximately vertical plate extending in the longitudinal direction of the terraces 7a. The first upper props 218a and 218b are installed to be movable upward or downward toward the upper surfaces of the long-side terraces 7a.

Meanwhile, the first upper props 218a and 218b have first upper cutting-edge portions 220a and 220b configured to come into contact with the upper surfaces of the long-side terraces 7a having the folded surfaces 8, and the first upper cutting-edge portions 220a and 220b extend vertically. Edge portions of extension ends of the first upper cutting-edge portions 220a and 220b are rounded to prevent the occurrence of scratches when the first upper cutting-edge portions 220a and 220b come into contact with the long-side terraces 7a.

In addition, first contact protrusion portions 226 are formed on outer surfaces of the first upper cutting-edge portions 220a and 220b facing the folded surfaces 8, and the first contact protrusion portions 226 extend in the longitudinal direction of the first upper cutting-edge portions 220a and 220b.

Figure 1:
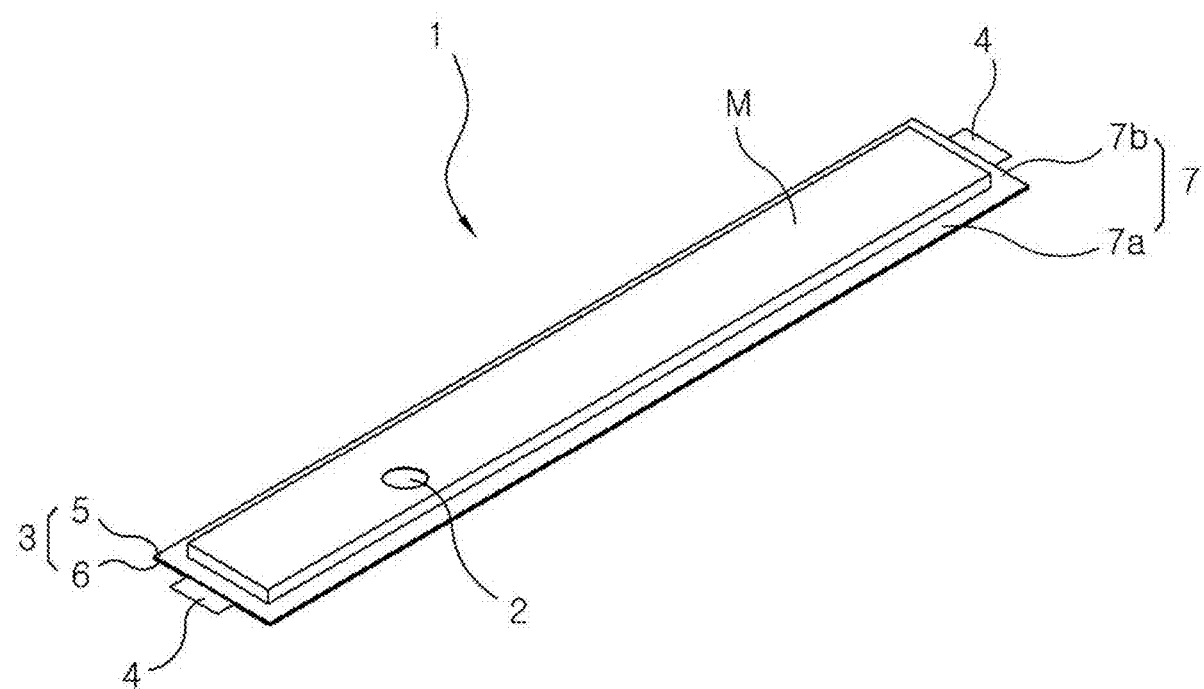
FIG. 1 is a view illustrating a pouch-type secondary battery related to the present disclosure.
Figure 2:
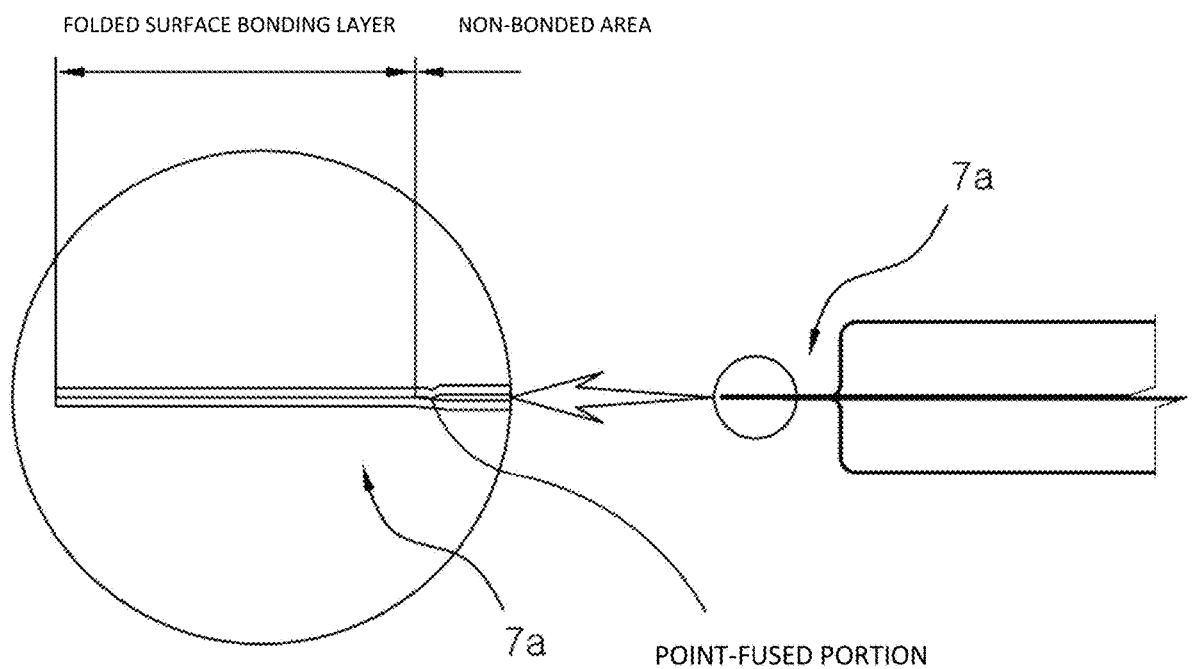
FIGS. 2, 3 and 4 are views schematically illustrating examples in which a bonding layer of a terrace separates, and insulation is broken down during a process of folding a long-side terrace of the pouch-type secondary battery illustrated in FIG. 1.
Figure 3:
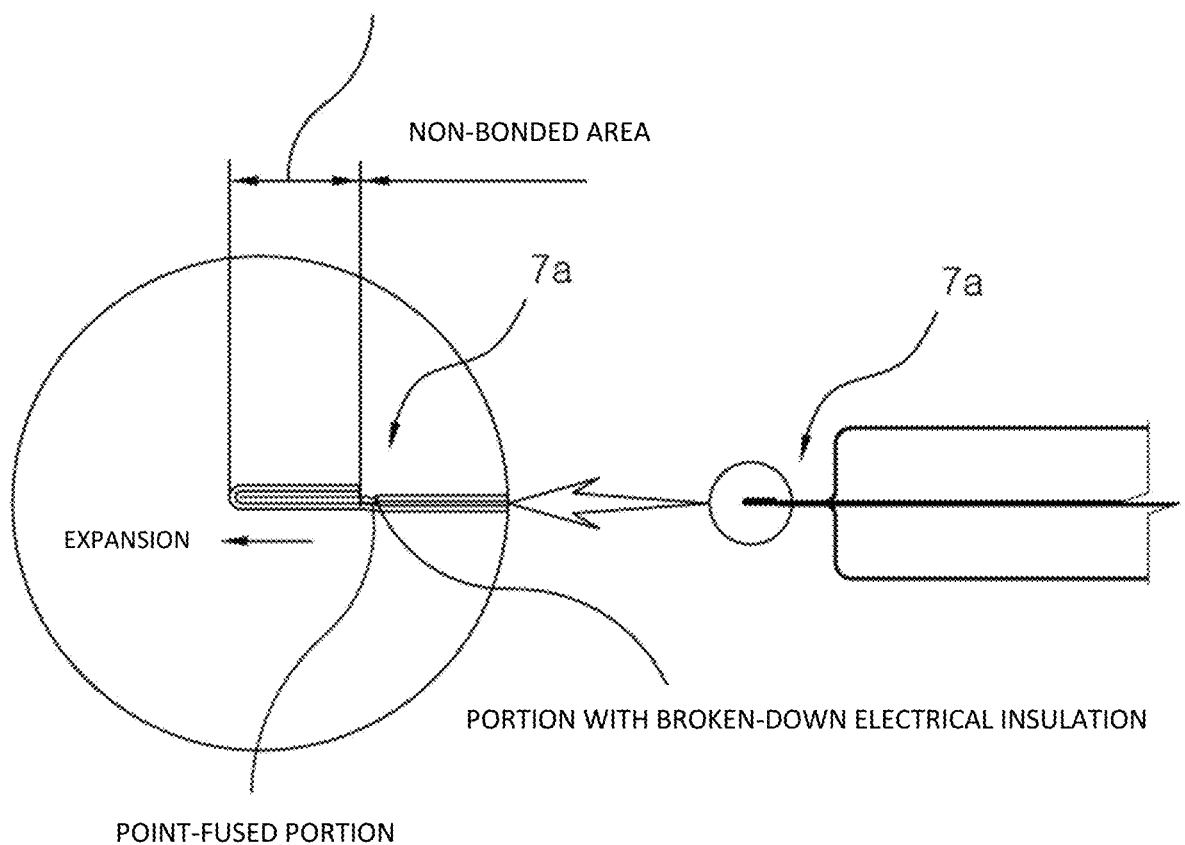
Figure 4:
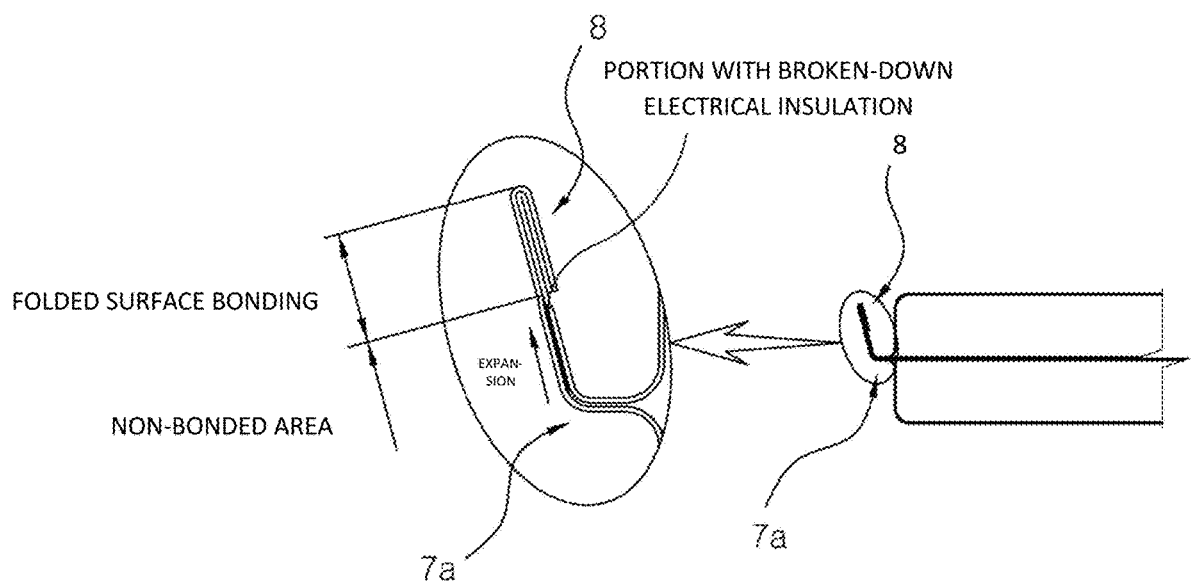

When the first pressing unit 230 presses the folded surfaces 8, the first contact protrusion portions 226, which are formed as described above, come into contact with non-bonded areas (see FIG. 2) of the long-side terraces 7a folded along the folded surfaces 8, such that the non-bonded areas are bonded.

Meanwhile, the first lower cutting-edge portions 216a and 216b and the first upper cutting-edge portions 220a and 220b have first lower protruding support portions 222 and first upper protruding support portions 214, respectively.

As illustrated, the first lower protruding support portions 222 are formed on the inner surfaces of the first lower cutting-edge portions 216a and 216b connected to the two opposite ends of the first lower cutting-edge portions 216a and 216b, and the first lower protruding support portions 222 protrude in a direction in which the first lower protruding support portions 222 face each other. Likewise, the first upper protruding support portions 224 are formed on the inner surfaces of the first upper cutting-edge portions 220a and 220b connected to the two opposite ends of the first upper cutting-edge portions 220a and 220b, and the first upper protruding support portions 224 protrude in a direction in which the first upper protruding support portions 224 face each other.

When the first lower cutting-edge portions 216a and 216b and the first upper cutting-edge portions 220a and 220b hold the long-side terraces 7a, upper surfaces of the first lower protruding support portions 222 and lower surfaces of the first upper protruding support portions 224 hold the short-side terraces 7b while coming into contact with the lower and upper surfaces of the short-side terraces 7b connected to the long-side terraces 7a.

That is, the first lower protruding support portions 222 and the first upper protruding support portions 224 prevent the short-side terraces 7b from being pushed and deformed when the first pressing unit 230 presses the folded surfaces 8.

Particularly, the first lower props 214a and 214b and the first upper props 218a and 218b may each be made of stainless steel (SUS), aluminum (Al), an aluminum alloy, or the like.

The first pressing unit 230 processes the folded surfaces 8 and the bonding layers of the folded surfaces 8 while applying heat and pressure to the folded surfaces 8 of the secondary battery 1 held by the first grip unit 210.

As illustrated, the first pressing unit 230 includes a pair of first pressing heads 232a and 232b.

The first pressing heads 232a and 232b are installed to face the lateral surfaces of the folded surfaces 8 of the secondary battery 1 held by the first grip unit 210. The first pressing heads 232a and 232b are installed to be movable to press the folded surfaces 8 toward the main chamber M, i.e., toward the first upper cutting-edge portions 220a and 220b of the first upper props 218a and 218b that hold the long-side terraces 7a.

In this case, the first pressing heads 232a and 232b horizontally extend in the longitudinal direction of the folded surfaces 8. Tip portions of the first pressing heads 232a and 232b facing the lateral surfaces of the folded surfaces 8 are each formed to have a thickness that faces the folded surface 8, i.e., the bonding layer of the folded surface 8 and the non-bonded area of the long-side terrace 7a folded along the folded surface 8.

Further, like the first upper cutting-edge portions 220a and 220b, the tip portions of the first pressing heads 132a and 132b are vertically formed to press the folded surfaces 8 toward the first upper cutting-edge portions 220a and 220b of the first upper props 218a and 218b.

Meanwhile, first heaters 234a and 234b may be embedded in the first pressing heads 232a and 232b and heat the first pressing heads 232a and 232b to a predetermined temperature, i.e., to a temperature that may melt the bonding layer of the folded surface 8. First heat pads 236a and 236b may be attached to the tip portions of the first pressing heads 232a and 232b and uniformly transfer heat of the first heaters 234a and 234b to the entire folded surfaces 8 while serving as a buffer at the time of pressing the folded surfaces 8.

The first pressing heads 232a and 232b of the first pressing unit 230, which are formed as described above, completely form the shapes of the folded surfaces 8 by bending the folded surfaces 8 toward the main chamber M by pressing the folded surfaces 8 against the first upper cutting-edge portions 220a and 220b while coming into contact with the lateral surfaces of the folded surfaces 8. Further, the first pressing heads 232a and 232b of the first pressing unit 230 restore the insulating layers, of which the electrical insulation is broken down, by transferring heat to the bonding layers of the folded surfaces 8 to melt the bonding layers and allowing the melted bonding layers to the portion where the electrical insulation is broken down.

Meanwhile, when the first pressing heads 232a and 232b press the folded surfaces 8, the non-bonded areas of the long-side terraces 7a folded along the folded surfaces 8 are pressed by the first contact protrusion portions 226 and the first pressing heads 232a and 232b and bonded as the polymer is melted by heat transferred from the first pressing heads 232a and 232b.

In addition, in the present disclosure, the first heaters 234a and 234b are not particularly limited. However, the first heaters 234a and 234b may have any configuration as long as the first heaters 234a and 234b may generate heat and heat the first pressing heads 232a and 232b to melt the bonding layers of the folded surfaces 8.

Particularly, the first heating heads 232a and 232b may each be made of stainless steel (SUS), aluminum (Al), an aluminum alloy, or the like.

In this case, operating states of the first folded surface pressing means 200 will be briefly described.

The secondary battery 1 having the folded surfaces 8 folded at 270 degrees on the long-side terraces 7a is mounted on the first cell transfer shuttle D1 in the state in which the main chamber M is aligned in the main chamber alignment means 100, and the secondary battery 1 is guided to the upper portions of the first station tables 212a and 212b and seated on the first station tables 212a and 212b. In this case, the first station tables 212a and 212b vacuum-suck the main chamber M of the secondary battery 1, and the first cell transfer shuttle D1 releases the vacuum-suction of the main chamber M of the secondary battery 1.

When the first station tables 212a and 212b vacuum-suck the main chamber M of the secondary battery 1, the first lower cutting-edge portions 216a and 216b of the first lower props 214a and 214b and the first upper cutting-edge portions 220a and 220b of the first upper props 218a and 218b hold the long-side terraces 7a while moving upward or downward and coming into contact with the lower and upper surfaces of the long-side terraces 7a having the folded surfaces 8. In this case, the first cell transfer shuttle D1 returns to the preceding process.

When the first station tables 212a and 212b vacuum-suck the main chamber M and the first lower props 214a and 214b and the first upper props 218a and 218b hold the long-side terraces 7a as described above, the first pressing heads 232a and 232b moves to the folded surfaces 8 adjacent thereto. In this case, the first pressing heads 232a and 232b bend the folded surfaces 8 toward the main chamber M by coming into contact with the lateral surfaces of the folded surfaces 8 and pressing the folded surfaces 8 toward the first upper cutting-edge portions 220a and 220b, thereby completely forming the shapes of the folded surfaces 8.

Further, at the same time, the first pressing heads 232a and 232b melt the bonding layers by transferring heat to the bonding layers of the folded surfaces 8. In this case, as the folded surfaces 8 are pressed by the first pressing heads 232a and 232b and the first upper cutting-edge portions 220a and 220b, the melted bonding layer flows to the portion where the electrical insulation is broken down. Therefore, the insulating layer is restored at the portion where the electrical insulation is broken down on the bonding layer of the folded surface 8.

Meanwhile, when the insulating layer is restored at the portion where the electrical insulation is broken down as described above, the first pressing heads 232a and 232b, the first lower props 214a and 214b, and the first upper props 218a and 218b are returned. At the same time, the main chamber M of the secondary battery 1 is vacuum-sucked and mounted on a second cell transfer shuttle D2 guided from the second folded surface pressing means 300.

Further, at the same time, the first station tables 212a and 212b release the vacuum-suction of the main chamber M of the secondary battery 1. In this case, the secondary battery 1 is guided to the second folded surface pressing means 300 along the second cell transfer shuttle D2.

The second folded surface pressing means 300 holds the main chamber M and the long-side terraces 7a of the secondary battery 1 guided from the first folded surface pressing means 200 and secondarily presses the folded surfaces 8 while applying heat and pressure to the folded surfaces 8. The second folded surface pressing means 300 vertically bends the folded surface 8 so that the folded surface 8 is inclined toward the lateral surface of the main chamber M. The second folded surface pressing means 300 melts the bonding layer of the folded surface 8 so that the melted bonding layer flows to the portion where the insulation is broken down.

The second folded surface pressing means 300 includes the second cell transfer shuttle D2, a second grip unit 310, and a second pressing unit 330.

The second cell transfer shuttle D2 is installed to reciprocate between the second folded surface pressing means 300 and the first folded surface pressing means 200.

The second cell transfer shuttle D2, which is installed as described above, moves to the first folded surface pressing means 200 while moving upward or downward and vacuum-suck the lower surface of the main chamber M of the secondary battery 1 with the primarily pressed folded surfaces 8, moves to the second grip unit 310, and unloads the held secondary battery 1 onto the second grip unit 310.

In this case, an operation of the second cell transfer shuttle D2 may be synchronized with the operation of the first cell transfer shuttle D1. That is, to ensure efficiency of the process time, the first cell transfer shuttle D1 may transfer the secondary battery 1 while the second cell transfer shuttle D2 transfers the secondary battery 1.

The second grip unit 310 holds the main chamber M and the long-side terraces 7a, which have the folded surfaces 8, of the secondary battery 1 guided from the first folded surface pressing means 200.

The second grip unit 310 includes second station tables 312a and 312b, second lower props 314a and 314b, and second upper props 318a and 318b.

The second station tables 312a and 312b vacuum-suck the main chamber M of the secondary battery 1 guided from the first folded surface pressing means 200.

As illustrated, the second station tables 312a and 312b are provided as a pair of second station tables. Further, the second station tables 312a and 312b are installed to face the lower surface of the main chamber M of the secondary battery 1 that is vacuum-sucked by the second cell transfer shuttle D2 and guided from the first folded surface pressing means 200.

In addition, the second station tables 312a and 312b extend in the longitudinal direction of the main chamber M to safely vacuum-suck the main chamber M without swaying the main chamber M.

That is, when the secondary battery 1, which has the folded surface 8 primarily pressed by the first folded surface pressing means 200, is mounted on the second cell transfer shuttle D2, guided to the upper portions of the second station tables 312a and 312b, and then seated on the second station tables 312a and 312b, the second station tables 312a and 312b vacuum-suck the main chamber M of the secondary battery 1. When the second station tables 312a and 312b vacuum-suck the main chamber M of the secondary battery 1, the second cell transfer shuttle D2 releases the vacuum-suction of the main chamber M of the secondary battery 1.

The second lower props 314a and 314b and the second upper props 318a and 318b come into contact with lower and upper surfaces of the long-side terraces 7a having the folded surfaces 8 and hold the long-side terraces 7a having the folded surfaces 8.

The second lower props 314a and 314b are provided as a pair of second lower props, and the second lower props 314a and 314b are installed to face the lower surfaces of the long-side terraces 7a vacuum-sucked by the second station tables 312a and 312b.

In this case, the second lower props 314a and 314b are each provided in the form of an approximately vertical plate extending in the longitudinal direction of the long-side terraces 7a. The second lower props 314a and 314b are installed to be movable upward or downward toward the lower surfaces of the long-side terraces 7a.

Meanwhile, the second lower props 314a and 314b have first lower cutting-edge portions 316a and 316b configured to come into contact with the lower surfaces of the long-side terraces 7a having the folded surfaces 8, and the first lower cutting-edge portions 316a and 316b extend vertically. Edge portions of extension ends of the second lower cutting-edge portions 316a and 316b are rounded to prevent the occurrence of scratches when the second lower cutting-edge portions 316a and 316b come into contact with the long-side terraces 7a.

As illustrated, like the second lower props 314a and 314b, the second upper props 318a and 318b are provided as a pair of second upper props, and the second upper props 318a and 318b are installed to face the upper surfaces of the long-side terraces 7a vacuum-sucked by the second station tables 312a and 312b.

That is, the second upper props 318a and 318b are installed to face the upper surfaces of the long-side terraces 7a exposed between the folded surfaces 8 and the lateral surfaces of the main chamber M of the secondary battery 1.

In this case, the second upper props 318a and 318b are each provided in the form of an approximately vertical plate extending in the longitudinal direction of the terraces 7a. The second upper props 318a and 318b are installed to be movable upward or downward toward the upper surfaces of the long-side terraces 7a.

Meanwhile, the second upper props 318a and 318b have second upper cutting-edge portions 320a and 320b configured to come into contact with the upper surfaces of the long-side terraces 7a having the folded surface 8. The second upper cutting-edge portions 320a and 320b extend to be inclined downward from the lateral surface of the main chamber M toward the folded surfaces 8 adjacent thereto.

Further, edge portions of extension ends of the second upper cutting-edge portions 320a and 320b are rounded to prevent the occurrence of scratches when the second upper cutting-edge portions 320a and 320b come into contact with the long-side terraces 7a.

In addition, second contact protrusion portions 326 are formed on outer surfaces of the second upper cutting-edge portions 320a and 320b facing the folded surfaces 8, and the second contact protrusion portions 326 extend in the longitudinal direction of the second upper cutting-edge portions 320a and 320b.

When the second pressing unit 330 presses the folded surfaces 8, the second contact protrusion portions 326, which are formed as described above, come into contact with non-bonded areas (see FIG. 2) of the long-side terraces 7a folded along the folded surfaces 8, such that the non-bonded areas are bonded.

Meanwhile, the second lower cutting-edge portions 316a and 316b and the second upper cutting-edge portions 320a and 320b have second lower protruding support portions 322 and second upper protruding support portions 314, respectively.

As illustrated, the second lower protruding support portions 322 are formed on the inner surfaces of the second lower cutting-edge portions 316a and 316b connected to the two opposite ends of the second lower cutting-edge portions 316a and 316b, and the second lower protruding support portions 322 protrudes in a direction in which the second lower protruding support portions 322 face each other. Likewise, the second upper protruding support portions 324 are formed on the inner surface of the second upper cutting-edge portions 320a and 320b connected to the two opposite ends of the second upper cutting-edge portions 320a and 320b, and the second upper protruding support portions 324 protrude in a direction in which the second upper protruding support portions 324 face each other.

When the second lower cutting-edge portions 316a and 316b and the second upper cutting-edge portions 320a and 320b hold the long-side terraces 7a, upper surfaces of the second lower protruding support portion 322 and lower surfaces of the second upper protruding support portion 324 hold the short-side terraces 7b while coming into contact with the lower and upper surfaces of the short-side terraces 7b connected to the long-side terraces 7a.

That is, the second lower protruding support portions 322 and the second upper protruding support portions 324 prevent the short-side terraces 7b from being pushed and deformed when the second pressing unit 230 presses the folded surfaces 8.

Particularly, the second lower props 314a and 314b and the second upper props 318a and 318b may each be made of stainless steel (SUS), aluminum (Al), an aluminum alloy, or the like.

The second pressing unit 330 processes the folded surfaces 8 and the bonding layers of the folded surfaces 8 while applying heat and pressure to the folded surfaces 8 of the secondary battery 1 held by the second grip unit 310.

As illustrated, the second pressing unit 330 includes a pair of first pressing heads 332a and 332b.

The second pressing heads 332a and 332b are installed to face the lateral surfaces of the folded surfaces 8 of the secondary battery 1 held by the second grip unit 310. The second pressing heads 332a and 332b are installed to be movable to press the folded surfaces 8 toward the main chamber M, i.e., toward the second upper cutting-edge portions 320a and 320b of the second upper props 318a and 318b that hold the long-side terraces 7a.

In this case, the second pressing heads 332a and 332b horizontally extend in the longitudinal direction of the folded surfaces 8. Tip portions of the second pressing heads 332a and 332b facing the lateral surfaces of the folded surfaces 8 are each formed to have a thickness that faces the folded surface 8, i.e., the bonding layer of the folded surface 8 and the non-bonded area of the long-side terrace 7a folded along the folded surface 8.

Further, the tip portions of the second pressing heads 332a and 332b may be formed to be inclined to have the same inclination angle as the second upper cutting-edge portions 320a and 320b so that the tip portions of the second pressing heads 332a and 332b may press the folded surfaces 8 toward the second upper cutting-edge portions 320a and 320b of the second upper props 318a and 318b.

Meanwhile, second heaters 334a and 334b may be embedded in the second pressing heads 332a and 332b and heat the second pressing heads 332a and 332b to a predetermined temperature, i.e., to a temperature that may melt the bonding layer of the folded surface 8. Second heat pads 336a and 336b may be attached to the tip portions of the second pressing heads 332a and 332b and uniformly transfer heat of the second heaters 334a and 334b to the entire folded surfaces 8 while serving as a buffer at the time of pressing the folded surfaces 8.

The second pressing heads 332a and 332b of the second pressing unit 330, which are formed as described above, completely form the shapes of the folded surfaces 8 by bending the folded surfaces 8 toward the main chamber M by pressing the folded surfaces 8 against the second upper cutting-edge portions 320a and 320b while coming into contact with the lateral surfaces of the folded surfaces 8. Further, the second pressing heads 332a and 332b of the second pressing unit 330 restore the insulating layers, of which the electrical insulation is broken down, by transferring heat to the bonding layers of the folded surfaces 8 to melt the bonding layers and allowing the melted bonding layers to flow to the portion where the electrical insulation is broken down.

Meanwhile, when the second pressing heads 332a and 332b press the folded surfaces 8, the non-bonded areas of the long-side terraces 7a folded along the folded surfaces 8 are pressed by the second contact protrusion portions 326 and the second pressing heads 332a and 332b and bonded as the polymer is melted by heat transferred from the second pressing heads 332a and 332b.

In addition, in the present disclosure, the second heaters 334a and 334b are not particularly limited. However, the second heaters 334a and 334b may have any configuration as long as the second heaters 334a and 334b may generate heat and heat the second pressing heads 332a and 332b to melt the bonding layers of the folded surfaces 8.

Particularly, the second heating heads 332a and 332b may each be made of stainless steel (SUS), aluminum (Al), an aluminum alloy, or the like.

Because an operation of the second folded surface pressing means 300, which is formed as described above, is substantially identical to the operation of the first folded surface pressing means 200, a detailed description thereof will be omitted.

Meanwhile, when the operation of the second folded surface pressing means 300 is completed, the secondary battery 1 is mounted on a third cell transfer shuttle D3 guided from a subsequent process, and the secondary battery 1 is guided to the subsequent process by an operation of the third cell transfer shuttle D3.

The hot-press system for folding a surface of a pouch-type secondary battery according to the present disclosure configured as described above may melt the bonding layer of the folded surface 8 through the primary and secondary melting processes and allow the melted bonding layer to the portion where the electrical insulation is broken down. Therefore, it is possible to restore the insulating layer, of which the electrical insulation is broken down. Therefore, it is possible to ensure the electrical insulation of the bonding layer of the folded surface 8.

In addition, the hot-press apparatus for folding a surface of a pouch-type secondary battery according to the present disclosure may bend the folded surface 8 toward the main chamber M through the primary and secondary bending processes. Therefore, it is possible to cope with springback of the folded surface M.

What is claimed is:

1. A hot-press system for folding a surface of a pouch-type secondary battery, the hot-press system comprising:
    a first folded surface pressing means configured to hold a main chamber and long-side terraces, which have folded surfaces, of a secondary battery, the first folded surface pressing means being configured to primarily press the folded surfaces while applying heat and pressure to the folded surfaces;
    a second folded surface pressing means configured to hold the main chamber and the long-side terraces, which have the folded surfaces, of the secondary battery guided from the first folded surface pressing means, the second folded surface pressing means being configured to secondarily press the folded surfaces while applying heat and pressure to the folded surfaces; and
    a main chamber alignment means configured to align the main chamber of the secondary battery having the folded surfaces and guide the secondary battery to the first folded surface pressing means, wherein the main chamber alignment means comprises:
a pair of alignment bodies installed to face each other with the main chamber of the secondary battery, which is guided from a preceding process, interposed therebetween, the pair of alignment bodies being configured to align the main chamber while moving to the main chamber; and
a first air spray unit configured to spray air toward an upper surface of the main chamber to prevent the main chamber from being lifted up from the alignment bodies when the alignment bodies align the main chamber.

2. The hot-press system of claim 1, wherein the alignment bodies comprise:
first contact portions configured to come into contact with a lower surface of the main chamber; and
second contact portions configured to come into contact with a lateral surface of the main chamber.

3. The hot-press system of claim 2, wherein the second contact portion is configured to come into contact with the lateral surface of the main chamber having the long-side terrace connected to the lower surface of the main chamber.

4. The hot-press system of claim 2, wherein the first contact portion and the second contact portion intersect each other at a right angle.

5. The hot-press system of claim 2, wherein protrusions each protruding in a hemispherical shape are formed on the first contact portion and disposed in a plurality of columns and rows to minimize friction with the lower surface of the main chamber during a process of aligning the main chamber.

6. The hot-press system of claim 1, wherein the first air spray unit comprises:
a first compressor configured to generate compressed air; and
first spray nozzles configured to spray compressed air, which is supplied from the first compressor, toward the upper surface of the main chamber.

7. The hot-press system of claim 6, wherein the first spray nozzles are connected to the first compressor through a flow path, and
wherein the first spray nozzles are installed in branch flow paths that branch off from a flow path and face the upper surface of the main chamber, or the first spray nozzles are installed on a lower surface of a plate that has therein a flow path chamber connected to the flow path and faces the upper surface of the main chamber.

8. The hot-press system of claim 1, wherein the main chamber alignment means further comprises second air spray units configured to spray air toward a lower surface of the main chamber to move the main chamber when the alignment bodies align the main chamber.

9. The hot-press system of claim 8, wherein the second air spray unit comprises:
a second compressor configured to generate compressed air; and
second spray nozzles configured to spray the compressed air, which is supplied from the second compressor, toward the lower surface of the main chamber.

10. The hot-press system of claim 9, wherein the second spray nozzles are connected to the second compressor through a flow path, and the second spray nozzles are installed on first contact portions of the alignment bodies that come into contact with the lower surface of the main chamber.

11. The hot-press system of claim 1, wherein the first folded surface pressing means comprises:
a first grip unit configured to hold the main chamber and the long-side terraces, which have the folded surfaces, of the secondary battery guided from the main chamber alignment means;
a first pressing unit configured to primarily press the folded surfaces while applying heat and pressure to the folded surfaces; and
a first cell transfer shuttle configured to load the secondary battery at the main chamber alignment means and unload the secondary battery onto the first grip unit, and
wherein the first grip unit comprises:
first station tables configured to suck the main chamber;
first lower props configured to come into contact with lower surfaces of the long-side terraces; and
first upper props configured to hold the long-side terraces together with the first lower props while coming into contact with upper surfaces of the long-side terraces exposed between the folded surfaces and a lateral surface of the main chamber.

12. The hot-press system of claim 1, wherein the second folded surface pressing means comprises:
a second grip unit configured to hold the main chamber and the long-side terraces, which have the folded surfaces, of the secondary battery guided from the first folded surface pressing means;
a second pressing unit configured to secondarily press the folded surfaces while applying heat and pressure to the folded surfaces; and
a second cell transfer shuttle configured to load the secondary battery at the first folded surface pressing means and unload the secondary battery onto the second grip unit, and
wherein the second grip unit comprises:
second station tables configured to suck the main chamber;
second lower props configured to come into contact with lower surfaces of the long-side terraces; and
second upper props configured to hold the long-side terraces together with the second lower props while coming into contact with upper surfaces of the long-side terraces exposed between the folded surfaces and a lateral surface of the main chamber.

13. The hot-press system of claim 11, wherein the first lower props are provided as a pair of first lower props,
wherein the first lower props are installed to face the lower surfaces of the long-side terraces of the secondary battery vacuum-sucked by the first station tables,
wherein the first lower props extend in a longitudinal direction of the long-side terraces and are installed to be movable upward or downward toward the lower surfaces of the long-side terraces,
wherein first lower cutting-edge portions are formed on the first lower props and configured to come into contact with the lower surfaces of the long-side terraces and extend vertically,
wherein edges of extension ends of the first lower cutting-edge portions are rounded,
wherein the first upper props are provided as a pair of first upper props,
wherein the first upper props are installed to face the upper surfaces of the long-side terraces of the secondary battery vacuum-sucked by the first station tables, and
wherein the first upper props extend in the longitudinal direction of the long-side terraces and are installed to be movable upward or downward toward the upper surfaces of the long-side terraces.

14. The hot-press system of claim 13, wherein first lower protruding support portions are formed on the first lower cutting-edge portions and configured to come into contact with lower surfaces of short-side terraces connected to the long-side terraces,
   wherein first upper cutting-edge portions are formed on the first upper props and configured to come into contact with the upper surfaces of the long-side terraces and extend vertically,
   wherein first upper protruding support portions are formed on the first upper cutting-edge portions and configured to come into contact with upper surfaces of the short-side terraces connected to the long-side terraces, and
   wherein the first lower protruding support portions hold the short-side terraces together with the first upper protruding support portions formed on the first upper props.

15. The hot-press system of claim 13, wherein first upper cutting-edge portions are formed on the first upper props and configured to come into contact with the upper surfaces of the long-side terraces and extend vertically,
   wherein the first upper cutting-edge portions extend to be inclined downward from the lateral surface of the main chamber to the folded surfaces adjacent thereto, and
   wherein edges of extension ends of the first upper cutting-edge portions are rounded.

16. The hot-press system of claim 14, wherein first contact protrusion portions are formed on outer surfaces of the first upper cutting-edge portions facing the folded surfaces and configured to come into contact with non-bonded areas of the long-side terraces folded along the folded surfaces, and
   wherein the first contact protrusion portions extend in a longitudinal direction of the first upper cutting-edge portions.

17. The hot-press system of claim 14, wherein the first pressing unit comprises a pair of first pressing heads installed to face lateral surfaces of the folded surfaces of the secondary battery held by the first grip unit,
   wherein the first pressing heads horizontally extend in a longitudinal direction of the folded surfaces and are installed to be movable to press the folded surfaces,
   wherein tip portions of the first pressing heads are each formed to have a thickness that faces a bonding layer of the folded surface and a non-bonded area of the long-side terrace folded along the folded surface,
   wherein the tip portions of the first pressing heads are vertically formed to press the folded surfaces toward the first upper cutting-edge portions of the first upper props,
   wherein first heaters are embedded in the first pressing heads and melt bonding layers of the folded surfaces when the folded surfaces are pressed, and
   wherein first heat pads are attached to the tip portions of the first pressing heads and uniformly transfer heat of the first heaters to the folded surfaces while serving as a buffer at the time of pressing the folded surfaces.

18. The hot-press system of claim 12, wherein the second lower props are provided as a pair of second lower props,
   wherein the second lower props are installed to face the lower surfaces of the long-side terraces of the secondary battery vacuum-sucked by the second station tables,
   wherein the second lower props extend in a longitudinal direction of the long-side terraces and are installed to be movable upward or downward toward lower surface of the long-side terraces,
   wherein second lower cutting-edge portions are formed on the second lower props and configured to come into contact with the lower surfaces of the long-side terraces and extend vertically,
   wherein edges of extension ends of the second lower cutting-edge portions are rounded,
   wherein the second upper props are provided as a pair of second upper props,
   wherein the second upper props are installed to face the upper surfaces of the long-side terraces of the secondary battery vacuum-sucked by the second station tables, and
   wherein the second upper props extends in the longitudinal direction of the long-side terraces and are installed to be movable upward or downward toward the upper surfaces of the long-side terraces.

19. The hot-press system of claim 18, wherein second lower protruding support portions are formed on the second lower cutting-edge portions and configured to come into contact with lower surfaces of short-side terraces connected to the long-side terrace,
   wherein second upper protruding support portions are formed on the second upper cutting-edge portions and configured to come into contact with upper surfaces of the short-side terraces connected to the long-side terraces, and
   wherein the second lower protruding support portions hold the short-side terraces together with the second upper protruding support portions formed on the second upper props.

20. The hot-press system of claim 18, wherein second upper cutting-edge portions are formed on the second upper props and configured to come into contact with the upper surfaces of the long-side terraces and extend vertically,
   wherein the second upper cutting-edge portions extend to be inclined downward from lateral surface of the main chamber to the folded surfaces adjacent thereto, and
   wherein edges of extension ends of the second upper cutting-edge portions are rounded.

21. The hot-press system of claim 20, wherein second contact protrusion portions are formed on outer surfaces of the second upper cutting-edge portions facing the folded surfaces and configured to come into contact with non-bonded areas of the long-side terraces folded along the folded surfaces, and
   wherein the second contact protrusion portions extend in a longitudinal direction of the second upper cutting-edge portions.

22. The hot-press system of claim 12, wherein the second pressing unit comprises a pair of second pressing heads installed to face lateral surfaces of the folded surfaces of the secondary battery held by the second grip unit,
   wherein the second pressing heads horizontally extend in a longitudinal direction of the folded surfaces and are installed to be movable to press the folded surfaces,
   wherein tip portions of the second pressing heads are each formed to have a thickness that faces a bonding layer of the folded surface and a non-bonded area of the long-side terrace folded along the folded surface,
   wherein the tip portions of the second pressing heads are vertically formed to press the folded surfaces toward the vertical second upper cutting-edge portions of the second upper props,
   wherein second heaters are embedded in the second pressing heads and melt bonding layers of the folded surfaces when the folded surfaces are pressed, and wherein second heat pads are attached to the tip portions of the second pressing heads and uniformly transfer heat of the second heater to the folded surfaces while serving as a buffer at the time of pressing the folded surfaces.

* * * * *